3,332,921
1-BUTENE-PROPYLENE COPOLYMERS
James W. Cleary, Bartlesville, Okla., assignor to Phillips
Petroleum Company, a corporation of Delaware
No Drawing. Filed Nov. 1, 1963, Ser. No. 320,838
4 Claims. (Cl. 260—88.2)

This invention relates to novel copolymers of 1-butene and propylene, methods of preparation of such copolymers, and films made from such copolymers.

Films formed from various olefin polymers such as polyethylene, polypropylene and the like have enjoyed wide commercial acceptance in the packaging field. Films from such olefin polymers are attractive because of their clarity, can be processed with relative ease and are inexpensive. They are also quite resistant to chemicals and have a low moisture vapor transmission which makes them highly suitable for packaging commodities which must be protected from their environment. Difficulties have been encountered, however, in the use of such materials in unsupported form in large bags such as would be used for chemicals, grain, farm produce, and the like. This difficulty stems from the fact that plastic films frequently fail when subjected to rough handling such as dropping, stacking, being lifted by the corners, etc. Increasing the thickness of the film in order to solve such problems diminishes the economic advantage these plastics would otherwise enjoy. Another approach involves blending various additives with the resin in order to improve its toughness. This, however, introduces an additional step and employs materials which are usually more expensive than the olefin polymer.

I have discovered that films of exceptional strength and resistance to tear can be fabricated from a copolymer of 1-butene with polypropylene, where the propylene monomer is utilized in the range of about 6 to about 35 weight percent of the total monomer. These copolymers are characterized by exceptionally high elongation, high tensile strength and high yield of production.

Accordingly it is an object of the invention to provide novel copolymers which are highly suitable for the fabrication of film. Another object of the invention is to provide a film having exceptional stength and resistance to tear. Yet another object of the invention is to provide a novel method of producing polymers having high elongation and high tensile strength at high yields.

Other aspects, objects, and the several advantages of the invention will become apparent from a study of the disclosure and the appended claims to the invention.

The copolymers of the invention can be made through the utilization of known catalyst systems. A suitable catalyst system for this purpose is formed from an organometal compound and a titanium halide compound. One suitable catalyst is diethylaluminum chloride and the reaction product of titanium tetrachloride and aluminum. The ratio of the amount of the organometal compound to the titanium compound is generally in the range of about 0.1 to 1 to about 20 to 1 on a mol basis, preferably in the range of about 0.5 to 1 to about 5 to 1. The amount of the catalyst utilized is generally in the range of about 0.5 to about 2.5 weight percent of the monomer, preferably between about 0.65 and 1 percent.

The monomer charge consists essentially of 1-butene and propylene with the propylene constituting from about 6 to about 35 weight percent of the total monomer charge, preferably from about 10 to about 25 weight percent of the total monomer charge. The copolymers of the invention have a break tensile of at least 1500 p.s.i. and an elongation of at least 100 percent. The utilization of propylene in the preferred range of about 10 to about 25 weight percent of the total monomer charge provides copolymers having a break tensile of at least 3000 p.s.i. and an elongation of at least 500 percent. While the yield strength depends upon many factors including the catalyst, diluent and presence of poisons, the preferred range of propylene in the monomer charge also results in the highest yields obtainable with the two comonomers.

The polymerization reaction can be conducted at temperatures within the range of about −50° C. to about 150° C., preferably from about −20° C. to about 100° C. The pressure in the polymerization zone can be maintained from a partial vacuum to about 10,000 p.s.i.g., preferably in the range of about atmospheric to about 500 p.s.i.g. It is frequently desirable to conduct the copolymerization in the presence of elemental hydrogen. This tends to improve the processability and the tensile strength of the copolymer. The hydrogen can be added at the beginning of the polymerization reaction, at some stage during the polymerization, incrementally during the polymerization or continuously during the polymerization. The amount of hydrogen added is usually in the range of about 0.001 to about 10 mol percent of the total monomer, and preferably from about 0.05 to about 1 mol percent of the total monomer.

Suitable solvents for use in the polymerization reaction of this process are paraffins, cycloparaffins and/or aromatic hydrocarbons, which are relatively inert, non-deleterious and liquid under the conditions of the process. While the process is preferably carried out in the presence of the diluent, it can be conducted without the use of a diluent. Examples of diluents which can be used include butane, pentane, isooctane, cyclohexane, methylcyclohexane, and the like. Benzene, toluene, and the like can also be employed. It is also within the scope of the invention to utilize mixtures of two or more of the aforementioned diluents.

The process of this invention can be carried out as a batch process by pressuring the monomers into a reactor containing the catalyst and a diluent. Furthermore, the process can be carried out continuously by maintaining the above-described concentrations of reactants in the reactor for a suitable residence time. The residence time used in a continuous process can vary widely since it depends to a great extent upon the temperature at which the process is carried out. However, the residence time for the polymerization generally falls within the range of one second to an hour or more. In the batch process, the time for the reaction can also vary widely, such as up to 24 hours or more.

In one particular system the catalyst mixture can be preformed in the presence of a suitable solvent and sufficient monomers to just form particles. This material can be pumped into the reactor. In an alternative system the catalyst components can be introduced separately into the reactor to form the catalyst mixture in situ. The propylene and/or butene can be added to the reactor at the beginning of the reaction, or at some stage during the reaction a portion of the propylene and/or butene can be added in two or more increments spaced throughout the reaction period or the propylene and/or butene can be added continuously during the reaction. The monomers can be added separately or as a mixture.

At the completion of the polymerization reaction, any excess monomer is vented, and the contents of the reactor including the solid polymer swollen with diluent, are then treated to inactivate the catalyst and remove the catalyst residues. The inactivation of the catalyst can be accomplished by washing with an alcohol, water or other suitable material. In some instances the catalyst inactivating treatment also removes a major portion of the catalyst residues while in other cases it may be necessary to treat the polymer with an acid, base or other suitable material in order to effect the desired removal of catalyst residues.

the treatment of the polymer can be carried out in a comminution zone, such as a Waring Blendor, so that a finely divided polymer is thereby provided. The polymer is then separated from the diluent and treating agents, e.g., by decantation or filtration after which the polymer is dried. The diluent and alcohol can be separated by any suitable means, e.g., by fractional distillation, and reused in the process.

Various additives such as antioxidants, dyes, pigments, fillers and the like can be incorporated in the polymers.

reaction was maintained at 50° C. for 2.5 hours. At the end of the polymerization the reaction was quenched with methanol and the excess monomer was vented. The polymer was dissolved in xylene, filtered while hot, and then reprecipitated with methanol. The polymer was recovered, washed and dried, and physical properties were determined. Control runs yielding homopolymers of 1-butene and propylene were conducted under the same condition. The monomer charge, the conversion and the physical properties are shown for each run in Table I.

TABLE I

| Run | 1 | 2 | 3 | 4 | 5 | 6 | 7 | 8 | 9 | 10 | 11 |
|---|---|---|---|---|---|---|---|---|---|---|---|
| Butene, wt. percent | 100 | 97.5 | 95 | 92.5 | 90 | 80 | 70 | 50 | 30 | 10 | 0 |
| Propylene, wt. percent | 0 | 2.5 | 5 | 7.5 | 10 | 20 | 30 | 50 | 70 | 90 | 100 |
| Yield, gram of polymer/gram of reaction product | 101 | 137 | 116 | 175 | 320 | 401 | 157 | 79 | 137 | 232 | 165 |
| Tensile Break, p.s.i.[1] | 412 | 1,710 | 3,485 | 3,175 | 3,200 | 4,215 | 1,965 | 3,105 | 2,545 | 4,570 | 3,050 |
| Elongation, percent [1] | 1 | 11 | 876 | 290 | 650 | 873 | 227 | 9 | 8 | 10 | 2 |
| 100% Modulus, p.s.i.[1] |  |  | 1,470 | 2,045 | 1,600 | 1,085 | 1,840 |  |  |  |  |

[1] D-638-61T. Specimens are compression molded samples cut with a Type C die described in ASTM D-412-61T.

The polymers can be blended or admixed with one or more additional polymers and these blends can be converted to film and other useful shapes. The copolymer can be treated in any manner known to the art to improve printability, adhesion property, and the like.

The film is made by conventional fabricating methods. Frequently the blown tubing method is used. Such an operation is described in the U.S. Patent 2,952,874 of Robert Doyle. Modifications of this method which involve temperature conditioning and orientation of the polymer can also be used.

The combination of high tensile strength and unusually high elongation of the copolymers of the invention is characteristic of a polymer which when formed into film absorbs impact rather than cracking or tearing. The copolymer of the invention has a high resistance to tearing so that a heavily loaded package or bag formed from film of this copolymer can be lifted by a corner or edge without appreciable deformation.

The following example is presented in further illustration of the invention, but is not to be construed unduly limitation thereof.

EXAMPLE

A series of runs was made in which 1-butene was copolymerized with propylene. The catalyst used was obtained by mixing 0.271 gram (2.25 millimols) of diethylaluminum chloride with about 0.1 gram (0.50 millimol) of the reaction product of titanium tetrachloride and aluminum having an approximate formula of $Ti_3AlCl_{12}$. The total monomer charge was 100 grams of varying ratios of propylene and 1-butene. The monomer charge was introduced into a reactor with 200 milliliters of pentane, the catalyst and one liter of hydrogen. Each Reasonable variation and modification are possible within the scope of the foregoing disclosure and the appended claims to the invention.

I claim:
1. A copolymer of 1-butene and propylene having a break tensile strength of at least 3000 p.s.i. and an elongation of at least 500 percent, said copolymer being prepared by copolymerizing a monomer charge of 1-butene and propylene, with the propylene being 10 to 25 weight percent of the total monomer charge, with a catalyst prepared by mixing diethylaluminum chloride with a reaction product of titanium tetrachloride and aluminum having an approximate formula of $Ti_3AlCl_{12}$.

2. The copolymer of claim 1 prepared with hydrogen present in the copolymerization zone.

3. The process of preparing a copolymer of 1-butene and propylene having a break tensile strength of at least 3000 p.s.i. and an elongation of at least 500 percent, which comprises the step of copolymerizing a monomer charge of 1-butene and propylene, with the propylene being 10 to 25 weight percent of the total monomer charge, with a catalyst prepared by mixing diethylaluminum chloride with a reaction product of titanium tetrachloride and aluminum having an approximate formula of $Ti_3AlCl_{12}$.

4. The process of claim 3 comprising the step of having hydrogen present in said copolymerization.

References Cited

UNITED STATES PATENTS 3,093,624  6/1963  Gresham et al. _____ 260—88.2

JOSEPH L. SCHOFER, *Primary Examiner.*

L. EDELMAN, *Assistant Examiner.*